United States Patent
Schwartz et al.

(10) Patent No.: US 9,952,720 B2
(45) Date of Patent: Apr. 24, 2018

(54) CAPACITIVE TOUCH SCREEN INTERFERENCE DETECTION AND OPERATION

(75) Inventors: Adam Schwartz, Redwood City, CA (US); Tracy Scott Dattalo, Santa Clara, CA (US); Robin Hodgson, Los Gatos, CA (US); Joseph Kurth Reynolds, Alviso, CA (US)

(73) Assignee: Synaptics Incorporated, San Jose, CA (US)

( * ) Notice: Subject to any disclaimer, the term of this patent is extended or adjusted under 35 U.S.C. 154(b) by 532 days.

(21) Appl. No.: 13/434,713

(22) Filed: Mar. 29, 2012

(65) Prior Publication Data
US 2012/0249476 A1    Oct. 4, 2012

Related U.S. Application Data

(60) Provisional application No. 61/469,065, filed on Mar. 29, 2011.

(51) Int. Cl.
*G06F 3/044*    (2006.01)
*G06F 3/041*    (2006.01)

(52) U.S. Cl.
CPC ............ *G06F 3/044* (2013.01); *G06F 3/0418* (2013.01)

(58) Field of Classification Search
CPC combination set(s) only.
See application file for complete search history.

(56) References Cited

U.S. PATENT DOCUMENTS

| | | |
|---|---|---|
| 7,876,311 B2 | 1/2011 | Krah et al. |
| 8,004,305 B2 | 8/2011 | Jenkins et al. |
| 8,239,784 B2 | 8/2012 | Hotelling et al. |
| 8,314,779 B2 | 11/2012 | Chan et al. |
| 8,576,161 B2 | 11/2013 | Chang et al. |
| 8,643,624 B2 | 2/2014 | Day et al. |
| 2003/0210235 A1 | 11/2003 | Roberts |
| 2006/0026535 A1 | 2/2006 | Hotelling et al. |

(Continued)

OTHER PUBLICATIONS

ISA/KR, International Search Report and Written Opinion for International Application No. PCT/US2012/031293, 10 pages, dated Oct. 30, 2012 (Oct. 30, 2012).

(Continued)

*Primary Examiner* — William Boddie
*Assistant Examiner* — Jeffrey A Parker
(74) *Attorney, Agent, or Firm* — FBFK PC

(57) ABSTRACT

A processing system for a capacitive touch screen comprises sensor circuitry and control logic. The sensor circuitry is configured to communicatively couple with sensor electrodes of the capacitive touch screen. The control logic is configured to operate the capacitive touch screen in a first mode comprising interference sensing at a first level and input object sensing. The control logic is also configured to operate the capacitive touch screen in a second mode instead of the first mode in response to: interference measured in the first mode meeting an interference condition; and a determination that input is in a sensing region of the capacitive touch screen. Operating in the first mode, interference sensing is performed during a non-display update time. Operating in the second mode, interference sensing with the capacitive touch screen is either not performed or is performed at a second level, lower in fidelity than the first level.

13 Claims, 11 Drawing Sheets

(56) References Cited

U.S. PATENT DOCUMENTS

| | | |
|---|---|---|
| 2006/0227115 A1 | 10/2006 | Fry |
| 2008/0157782 A1 | 7/2008 | Krah |
| 2008/0158169 A1 | 7/2008 | O'Connor et al. |
| 2008/0162996 A1 | 7/2008 | Krah et al. |
| 2008/0309622 A1 | 12/2008 | Krah |
| 2008/0309628 A1 | 12/2008 | Krah et al. |
| 2009/0309625 A1 | 12/2009 | Jenkins et al. |
| 2010/0079401 A1 | 4/2010 | Staton |
| 2010/0110040 A1* | 5/2010 | Kim et al. ............ 345/174 |
| 2010/0214232 A1 | 8/2010 | Chan et al. |
| 2010/0238134 A1* | 9/2010 | Day et al. ............ 345/174 |
| 2010/0245286 A1* | 9/2010 | Parker ............ G06F 3/0416 345/174 |
| 2010/0295824 A1* | 11/2010 | Noguchi ............ G02F 1/13338 345/175 |
| 2010/0321305 A1* | 12/2010 | Chang et al. ............ 345/173 |
| 2011/0025634 A1 | 2/2011 | Krah et al. |
| 2011/0061947 A1 | 3/2011 | Krah et al. |
| 2011/0063993 A1* | 3/2011 | Wilson et al. ............ 370/254 |
| 2011/0096011 A1 | 4/2011 | Suzuki |
| 2011/0148801 A1 | 6/2011 | Bateman et al. |
| 2011/0193809 A1* | 8/2011 | Walley ............ G06F 3/044 345/173 |
| 2012/0001859 A1* | 1/2012 | Kim et al. ............ 345/173 |
| 2012/0262222 A1 | 10/2012 | Schwartz et al. |

OTHER PUBLICATIONS

"Office Action, U.S. Appl. No. 13/240,377 dated Jul. 2, 2013, 17 pages".
Office Action, U.S. Appl. No. 13/240,377, dated May 22, 2014, 22 pages.
Office Action, U.S. Appl. No. 13/240,377, dated Feb. 24, 2015, 8 pages.
Office Action, U.S. Appl. No. 13/240,377, dated Jun. 22, 2015, 24 pages.
Office Action Search Report for CN Application No. 201280025364.4, dated Sep. 21, 2015, 2 Pages.

* cited by examiner

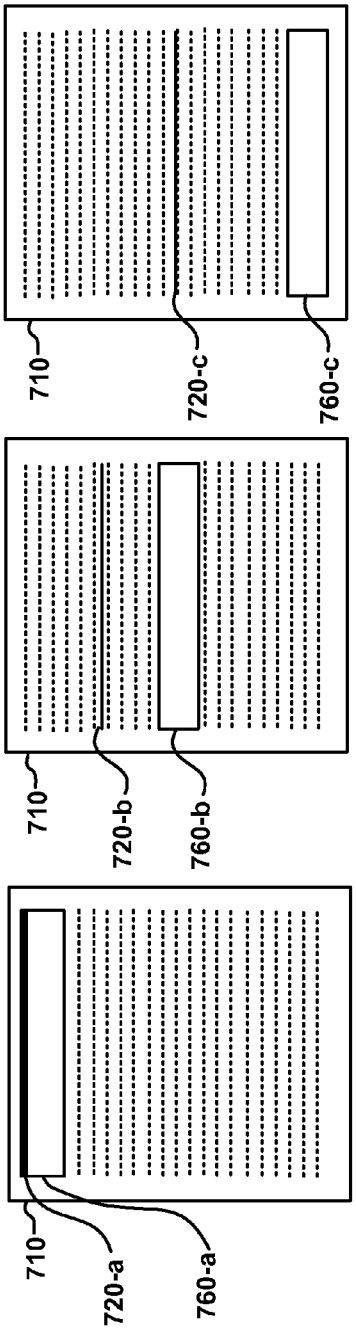

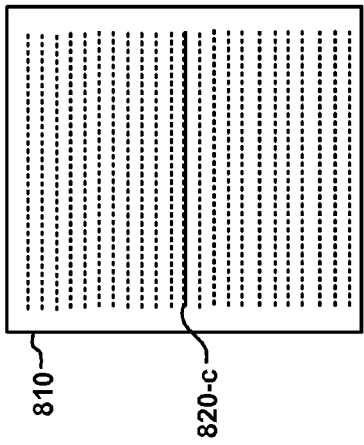
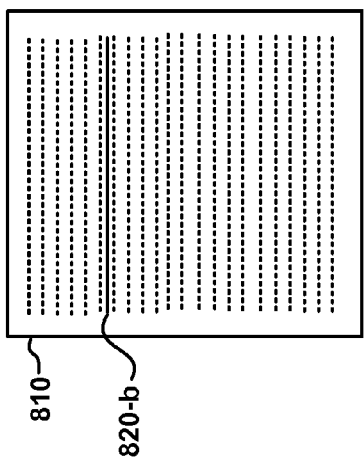
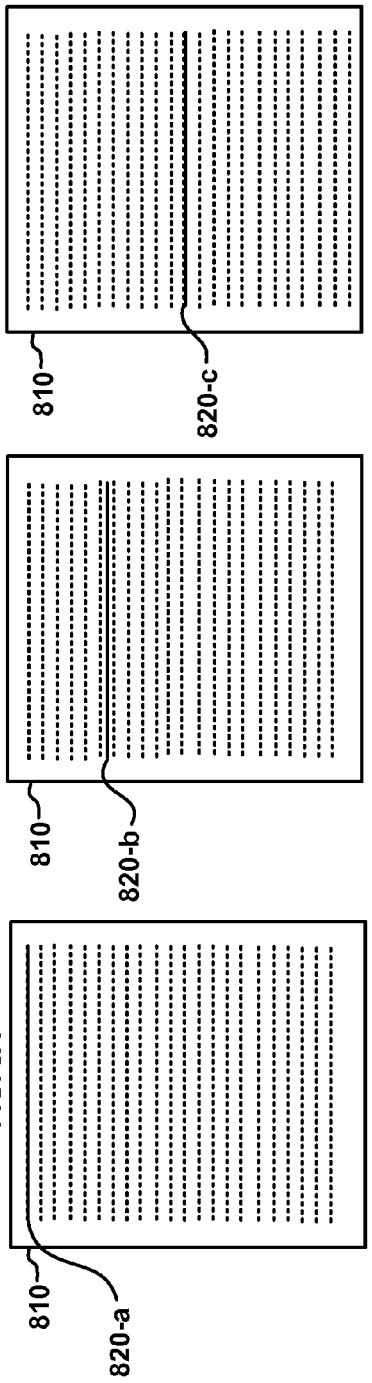
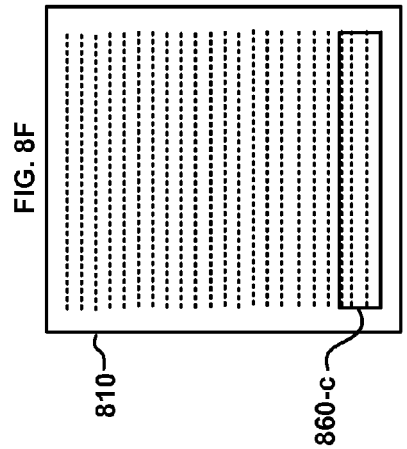
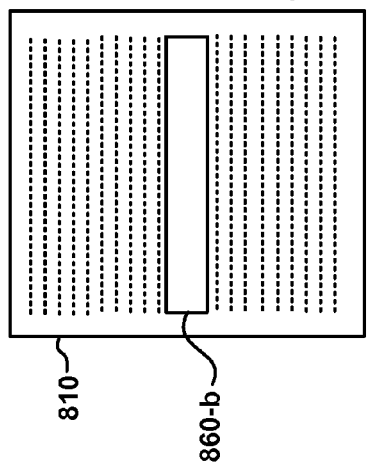
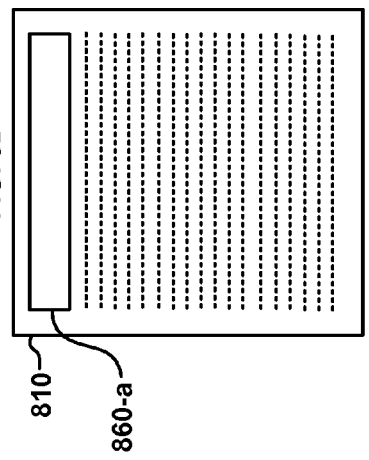

900

OPERATE IN A FIRST MODE, THE FIRST MODE COMPRISING INTERFERENCE SENSING AT A FIRST LEVEL AND INPUT SENSING, WHEREIN THE INTERFERENCE SENSING IS ACCOMPLISHED DURING A NON-DISPLAY UPDATE TIME

910

SWITCH TO OPERATING IN A SECOND MODE IN RESPONSE TO: INTERFERENCE MEASURED WHILE IN THE FIRST MODE SATISFYING AN INTERFERENCE CONDITION; AND A DETERMINATION THAT INPUT IS IN THE SENSING REGION, WHEREIN, WHILE IN THE SECOND MODE, INTERFERENCE SENSING IS EITHER NOT PERFORMED OR ELSE PERFORMED AT A SECOND LEVEL THAT IS LOWER IN FIDELITY THAN THE FIRST LEVEL

CAPACITIVE TOUCH SCREEN INTERFERENCE DETECTION AND OPERATION

CROSS-REFERENCE TO RELATED U.S. APPLICATIONS

This application claims priority to the provisional patent application Ser. No. 61/469,065, by Adam Schwartz, entitled "NOISE DETECTION FOR INTEGRATED DISPLAY AND SENSING," with filing date Mar. 29, 2011, and assigned to the assignee of the present application.

This application is related to U.S. patent application Ser. No. 13/240,377 by Adam Schwartz et al., filed on Sep. 22, 2011, entitled "CAPACITIVE INPUT DEVICE INTERFERENCE DETECTION AND OPERATION" and assigned to the assignee of the present invention.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones and tablet computers). Such touch screen input devices are typically superimposed upon or otherwise collocated with a display of the electronic device.

SUMMARY

A processing system for a capacitive touch screen comprises sensor circuitry and control logic. The sensor circuitry is configured to be communicatively coupled with sensor electrodes of the capacitive touch screen. The control logic is configured to operate the capacitive touch screen in a first mode comprising interference sensing at a first level and input object sensing. The control logic is also configured to operate the capacitive touch screen in a second mode instead of in the first mode in response to: interference measured in the first mode meeting an interference condition; and a determination that input is in a sensing region of the capacitive touch screen. While operating in the first mode, interference sensing is performed during a non-display update time. While operating in the second mode, interference sensing with the capacitive touch screen is either not performed or else is performed at a second level that is lower in fidelity than the first level.

BRIEF DESCRIPTION OF DRAWINGS

The drawings referred to in this Brief Description of Drawings should not be understood as being drawn to scale unless specifically noted. The accompanying drawings, which are incorporated in and form a part of the Description of Embodiments, illustrate various embodiments and, together with the Description of Embodiments, serve to explain principles discussed below, where like designations denote like elements, and:

FIGS. 7A-7F show an example of an integrated touch screen, according to an embodiment, where the capacitive frame rate is double that of the display update frame rate;

FIGS. 8A-8F show another example of an integrated touch screen, according to an embodiment, where the capacitive frame rate is double that of the display update frame rate; and FIGS. 9A and 9B show a flow chart of an example method of operating a capacitive input device configured to sense in a sensing region, in accordance with various embodiments.

DESCRIPTION OF EMBODIMENTS

The following Description of Embodiments is merely provided by way of example and not of limitation. Furthermore, there is no intention to be bound by any expressed or implied theory presented in the preceding technical field, background, brief summary or the following detailed description.

Overview of Discussion

Herein, various embodiments are described that provide input devices (such as touch screens), processing systems, display devices, combined input devices/display devices (integrated touch screens), and methods that facilitate improved usability. In various embodiments described herein, the input device may be a capacitive input device in the form of a touch screen that is associated with a display device and may or may not be integrated with the display device. Embodiments associated with capacitive touch screen interference detection and operation, are described herein. Utilizing techniques described herein, efficiencies may be achieved by balancing noise detection and input detection operations of a capacitive touch screen based on various factors.

Discussion begins with a description of an example input device with which or upon which various embodiments described herein may be implemented. Some example sensor electrode patterns are then described, including a sensor electrode pattern which comprises a common electrode used for both input sensing operations and display update operations in an integrated touch screen. This is followed by description of an example processing system and some components thereof. The processing system may be utilized with an input device, such as a capacitive sensing touch screen. Various frame rates for sensing and update are described. Operation of the capacitive touch screen, processing system, and components thereof are then further described in conjunction with description of various methods of operating a capacitive touch screen configured to sense in a sensing region.

Example Input Device

Figure 1:
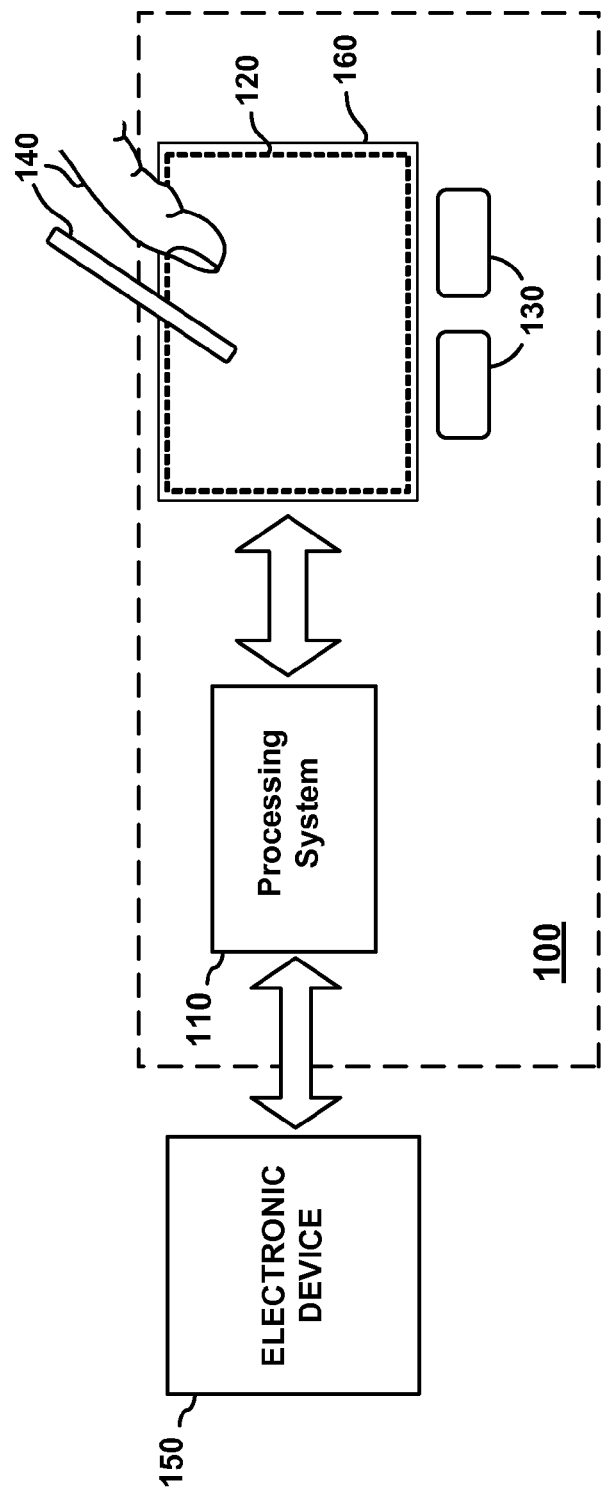
FIG. 1 is a block diagram of an example input device, in accordance with embodiments.

Turning now to the figures, FIG. 1 is a block diagram of an exemplary input device 100, in accordance with embodiments. Input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

Input device 100 can be implemented as a physical part of the electronic system, or can be physically separate from the electronic system. As appropriate, input device 100 may communicate with parts of the electronic system using any one or more of the following: buses, networks, and other wired or wireless interconnections. Examples include, but are not limited to: Inter-Integrated Circuit (I2C), Serial Peripheral Interface (SPI), Personal System 2 (PS/2), Universal Serial Bus (USB), Bluetooth®, Radio Frequency (RF), and Infrared Data Association (IrDA).

In FIG. 1, input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, sensing region 120 extends from a surface of input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of input device 100, contact with an input surface (e.g., a touch surface) of the input device 100, contact with an input surface of input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, sensing region 120 has a rectangular shape when projected onto an input surface of input device 100.

Input device 100 may utilize any combination of sensor components and sensing technologies to detect user input in the sensing region 120. Input device 100 comprises one or more sensing elements for detecting user input. As a non-limiting example, input device 100 may use capacitive techniques.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Collectively transmitters and receivers may be referred to as sensor electrodes or sensor elements. Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive. In some embodiments, one or more receiver electrodes may be operated to receive a resulting signal when no transmitter electrodes are transmitting (e.g., the transmitters are disabled). In this manner, the resulting signal represents noise detected in the operating environment of sensing region 120.

In FIG. 1, a processing system 110 is shown as part of input device 100. The processing system 110 is configured to operate the hardware of input device 100 to detect input in the sensing region 120. Processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, processing system 110 also comprises electronically-readable instructions, such as firmware code, software code, and/or the like. In some embodiments, components composing processing system 110 are located together, such as near sensing element(s) of input device 100. In other embodiments, components of processing system 110 are physically separate with one or more components close to sensing element(s) of input device 100, and one or more components elsewhere. For example, input device 100 may be a peripheral coupled to a desktop computer, and processing system 110 may comprise software configured to run on a central processing unit of the desktop computer and one or more ICs (perhaps with associated firmware) separate from the central processing unit. As another example, input device 100 may be physically integrated in a phone, and processing system 110 may comprise circuits and firmware that are part of a main processor of the phone. In some embodiments, processing system 110 is dedicated to implementing input device 100. In other embodiments, processing system 110 also performs other functions, such as operating display screens, driving haptic actuators, etc.

Processing system 110 may be implemented as a set of modules that handle different functions of processing system 110. Each module may comprise circuitry that is a part of processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, processing system 110 responds to user input (or lack of user input) in sensing region 120 directly by causing one or more actions. Example actions include changing operation modes, as well as GUI actions such as cursor movement, selection, menu navigation, and other functions. In some embodiments, processing system 110 provides information about the input (or lack of input) to some part of the electronic system (e.g., to a central processing system of the electronic system that is separate from processing system 110, if such a separate central processing system exists). In some embodiments, some part of the electronic system processes information received from processing system 110 to act on user input, such as to facilitate a full range of actions, including mode changing actions and GUI actions.

For example, in some embodiments, processing system 110 operates the sensing element(s) of input device 100 to produce electrical signals indicative of input (or lack of input) in sensing region 120. Processing system 110 may perform any appropriate amount of processing on the electrical signals in producing the information provided to the electronic system. For example, processing system 110 may digitize analog electrical signals obtained from the sensor electrodes. As another example, processing system 110 may perform filtering or other signal conditioning. As yet another example, processing system 110 may subtract or otherwise account for a baseline, such that the information reflects a difference between the electrical signals and the baseline. As yet further examples, processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, input device 100 is implemented with additional input components that are operated by processing system 110 or by some other processing system. These additional input components may provide redundant functionality for input in sensing region 120, or some other functionality. FIG. 1 shows buttons 130 near sensing region 120 that can be used to facilitate selection of items using input device 100. Other types of additional input components include sliders, balls, wheels, switches, and the like. Conversely, in some embodiments, input device 100 may be implemented with no other input components.

In some embodiments, input device 100 may be a touch screen, and sensing region 120 overlaps at least part of an active area of a display screen 160. For example, the input device 100 may comprise substantially transparent sensor electrodes overlaying the display screen 160 and provide a touch screen for the associated electronic system. The display screen 160 may be any type of dynamic display capable of displaying a visual interface to user, and may include any type of light emitting diode (LED), organic LED (OLED), cathode ray tube (CRT), liquid crystal display (LCD), plasma, electroluminescence (EL), or other display technology. The input device 100 and the display screen 160 may share physical elements. For example, some embodiments may utilize some of the same electrical components for displaying and sensing. As another example, the display screen 160 may be operated in part or in total by processing system 110.

It should be understood that while many embodiments are described in the context of a fully functioning apparatus, the mechanisms are capable of being distributed as a program product (e.g., software) in a variety of forms. For example, the mechanisms that are described may be implemented and distributed as a software program on information bearing media that are readable by electronic processors (e.g., non-transitory computer-readable and/or recordable/writable information bearing media readable by processing system 110). Additionally, the embodiments apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other tangible storage technology.

Example Sensor Electrode Pattern

Figure 2A:
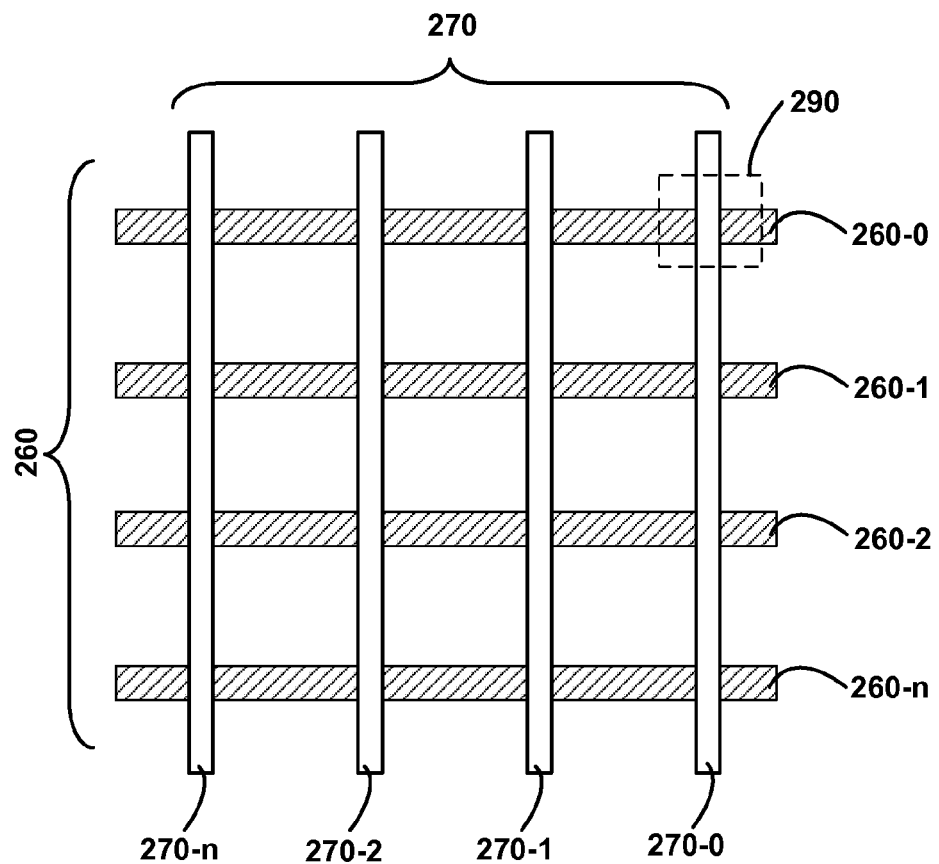
FIG. 2A shows a portion of an example sensor electrode pattern which may be utilized in a sensor to generate all or part of the sensing region of an input device, such as a touch screen, according to some embodiments.

FIG. 2A shows a portion of an example sensor electrode pattern 200A which may be utilized in a sensor to generate all or part of the sensing region of a input device 100, according to various embodiments. Input device 100 is configured as a capacitive input device when utilized with a capacitive sensor electrode pattern. For purposes of clarity of illustration and description, a non-limiting simple rectangular sensor electrode pattern 200A is illustrated. It is appreciated that numerous other sensor electrode patterns may be employed. The illustrated sensor electrode pattern is made up of a plurality of receiver electrodes 270 (270-0, 270-1, 270-2 . . . 270-n) and a plurality of transmitter electrodes 260 (260-0, 260-1, 260-2 . . . 260-n) which overlay one another, in this example. In the illustrated example, touch sensing pixels are centered at locations where transmitter and receiver electrodes cross. Capacitive pixel 290 illustrates one of the capacitive pixels generated by sensor electrode pattern 200A. It is appreciated that in a crossing sensor electrode pattern, such as the illustrated example, some form of insulating material or substrate is typically disposed between transmitter electrodes 260 and receiver electrodes 270. However, in some embodiments, transmitter electrodes 260 and receiver electrodes 270 may be disposed on the same layer as one another through use of routing techniques and/or jumpers. Furthermore, in other embodiments a plurality of receiver electrodes 270 and/or a plurality of transmitter electrodes 260 may be formed of various shapes, such as pronged or tined electrodes, U-shaped electrodes or electrode elements having unique shapes (e.g., H or I shaped electrode elements). In various embodiments, touch sensing includes sensing input objects anywhere in sensing region 120 and may comprise: no contact with any surfaces of the input device 100, contact with an input surface (e.g., a touch surface) of the input device 100, contact with an input surface of the input device 100 coupled with some amount of applied force or pressure, and/or a combination thereof.

Capacitive pixels, such as capacitive pixel 290, are areas of localized capacitive coupling between transmitter electrodes 260 and receiver electrodes 270. The capacitive coupling between transmitter electrodes 260 and receiver electrodes 270 changes with the proximity and motion of input objects in the sensing region associated with transmitter electrodes 260 and receiver electrodes 270.

In some embodiments, sensor electrode pattern 200A is "scanned" to determine these capacitive couplings. That is, the transmitter electrodes 260 are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 270 to be independently determined.

The receiver electrodes 270 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The baseline capacitance of a sensor device is the capacitive image associated with no input object in the sensing region. The baseline capacitance changes with the environment and operating conditions, and may be estimated in various ways. For example, some embodiments take "baseline images" when no input object is determined to be in the sensing region, and use those baseline images as estimates of their baseline capacitances.

Capacitive images can be adjusted for the baseline capacitance of the sensor device for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

As described herein, some embodiments are configured to measure environmental interference (e.g., ambient noise) during a time when no transmitter signals are being transmitted. In this way, resulting signals received by the receiver electrodes would not contain any effects due to the transmitter signals.

Figure 2B:
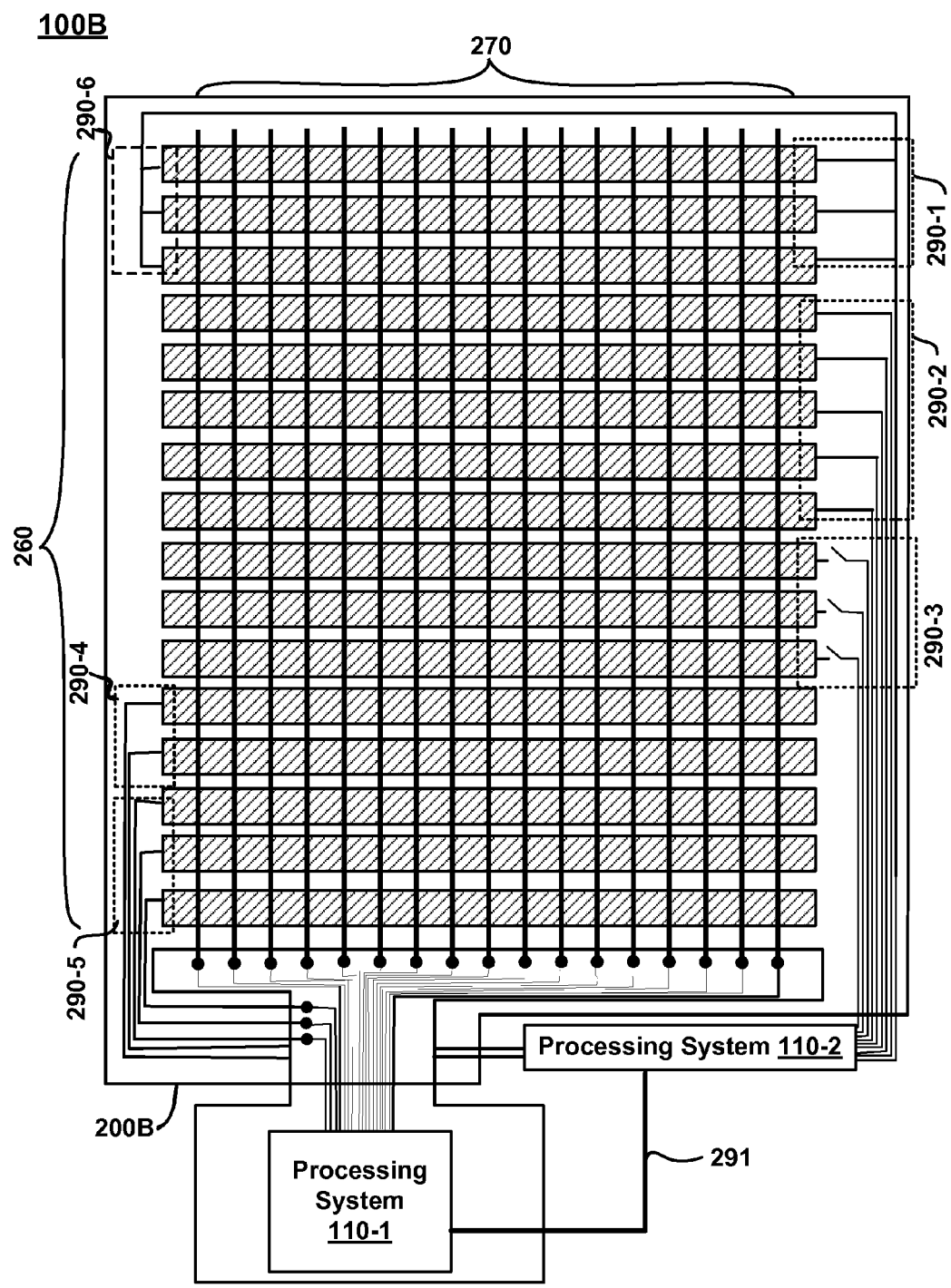
FIG. 2B shows an input device comprising a sensor electrode pattern which includes a plurality of common electrodes, and which may be utilized in a sensor to generate all or part of the sensing region of an input device, such as a touch screen, according to some embodiments.

FIG. 2B shows an input device comprising a sensor electrode pattern which includes a plurality of common electrodes, and which may be utilized in a sensor to generate all or part of the sensing region of an input device, such as a touch screen, according to some embodiments. FIG. 2B shows input device 100B with a sensor electrode pattern 200B (comprising common electrodes 260 and receiver electrodes 270), and a processing system 110 (illustrated in two portions, 110-1 and 110-2).

In FIG. 2B, processing system portion 110-1 is coupled with receiver electrodes 270 and configured to receive resulting signals from receiver electrodes 270. Processing system portion 110-2 is coupled with common electrodes 260, and comprises display circuitry (not shown) configured for displaying images on a combination display screen/touch screen 160/100 which may be referred to herein as an "integrated touch screen." The display circuitry is configured to apply one or more pixel voltage(s) to the display pixel electrodes through pixel source drivers (not shown). The display circuitry is also configured to apply one or more common drive voltage(s) to the common electrodes 260, and operate them as V-com electrodes of the display screen portion of the integrated touch screen. (In some embodiments (e.g., line inversion embodiments), the display circuitry is also configured to invert the common drive voltage in synchronization with a drive cycle of the image display upon the display screen portion.) The processing system portion 110-2 is also configured to operate common electrodes 260 as transmitter electrodes for capacitive sensing on the touch screen portion of integrated touch screen.

In the embodiment of FIG. 2B, the processing system for the device (e.g., an example of the processing system 110 of FIG. 1), comprises two separate portions 110-1 and 110-2. In other embodiments, the processing system may be implemented as more or fewer portions. For example, the functions of the processing system portion 110-1 and the processing system portion 110-2 may be implemented as one integrated circuitry. Synchronization between separate processing system portions 110-1, 110-2, etc., may be achieved by communicating between portions with synchronization mechanism 291. For example, synchronization mechanism 291 may synchronize display updating and capacitive sensing by providing a synchronized clock, information about display update state, information about the capacitive sensing state, direction to display circuitry to update (or not to update), direction to capacitive sensing circuitry to sense (or not to sense), and/or the like.

In various embodiments, the common electrodes transmit signals for display updating and capacitive sensing in the same time period, or in different time periods. For example, the common electrodes may transmit signals for display updating during a display-update time of a row update cycle, and transmit signals for capacitive sensing during a non-display time of the row update cycle (e.g., sometimes called "horizontal blanking time"). As another example, the common electrodes may transmit signals for display updating during row update cycles with actual display row updates, and transmit signals for capacitive sensing during extra "row update cycles" without actual display row updates (e.g., the non-display times between updating sections of frames or entire frames, sometimes called "vertical blanking time"). As a further example, the common electrodes may transmit signals simultaneously for display updating and capacitive sensing, but separate them spatially. As yet another example, the common electrodes may use the same transmission for both display updating and capacitive sensing.

In some touch screen embodiments, other components are shared in addition (or in place of) common electrodes. For example, one processing system may be used to perform both capacitive sensing and display updating functions.

Some embodiments are configured to measure environmental interference (e.g., ambient noise) during a time when no transmitter signals are being transmitted. In this way, resulting signals received by the receiver electrodes would not contain any effects due to the transmitter signals.

Some touch screen embodiments also synchronize environmental interference detection with display screen operation, such that interference caused by display screen operation is avoided in part or in whole, is anticipated and accommodated in some other manner (e.g., operating at an unlike frequency or phase, filtering, etc.), and/or the like.

Some touch screen embodiments with synchronized capacitive sensing and display updating are configured to detect environmental interference without changing the synchronization between display updating and capacitive sensing or disturbing the display updating sequence. For example, some embodiments with common electrodes are configured to detect environmental interference by not driving the common electrodes to update the display or to transmit transmitter signals for capacitive sensing during a non-display time (e.g., horizontal blanking time, vertical blanking time). These embodiments may or may not sense input objects during another non-display time (e.g., vertical blanking time or another part of the horizontal blanking time if the embodiment senses interference during the horizontal blanking time, horizontal blanking time or another part of the vertical blanking time if the embodiment senses interference during the vertical blanking time).

As another example, some embodiments are configured to detect environmental interference and not sense input objects during for one or more parts of a capacitive frame period, or even for an entire capacitive frame period, while display updating proceeds as usual. Here, "capacitive frame period" is used to indicate the time period allotted for capacitive sensing, which usually corresponds with when a capacitive image is acquired (or would have been acquired if not measuring interference). The embodiments which detect interference for part of a capacitive frame period may or may not perform any input object detecting during another part of that same capacitive frame period. Where input object detection is performed, it may be to the same or a lower resolution than that of a frame without interference detection. For example, some such embodiments may be configured to detect presence/no presence of input objects in the sensing region, or to detect positional information to a coarser resolution.

Some touch screen embodiments with synchronized capacitive sensing and display updating are configured to detect environmental interference in a way that does change the display updating sequence. For example, some embodiments are configured to pause display updating while sensing interference. After interference has been sensed, display updating restarts.

As yet another example, some embodiments detect interference by pausing the capacitive scanning associated with input object detection while continuing to update the display. This approach may change the synchronization of the capacitive sensing and the display updating. To accommodate these changes, these embodiments may be configured to track the relationship between the capacitive scanning associated with input object detection and the display updating, map portions of different frame types to portions of the capacitive measurements, and adjust the capacitive measurements appropriately. ("Frame type" is discussed further below in conjunction with FIGS. 7A-7F and 8A-8F.)

Some touch screens and/or input devices in accordance with various embodiments operate according to a method comprising: operating in an interference sensing state and separately operating in an input object sensing state. While sensing interference in the interference sensing state, the touch screen/input device may not transmit transmitter signals. While sensing input objects in the input object sensing state, the touch screen/input device does transmit transmitter signals.

The interference sensing state and the input object sensing state may each have any appropriate duration. For example, a touch screen/input device may be in the interference sensing state (or the input object sensing state) for a portion of a capacitive frame, or last for many capacitive frames, before switching out of that state. As another example, a touch screen/input device may be in the interference sensing state (or the input object sensing state) until one or more criteria are met. Example criteria include interference level detected, the presence (or lack of presence) of input objects, the type of input detected, etc.

Some touch screens/input devices in accordance with various embodiments operate according to a method that further comprises: operating in an interference avoidance state, wherein one or more interference avoidance actions is taken. The interference avoidance state may similarly last any appropriate duration. For example, some touch screens/input devices may operate with interference avoidance states that occur between capacitive frames, for one or more portions of one or more capacitive frames, or for one or more entire capacitive frames.

Example Processing System

Figure 3:
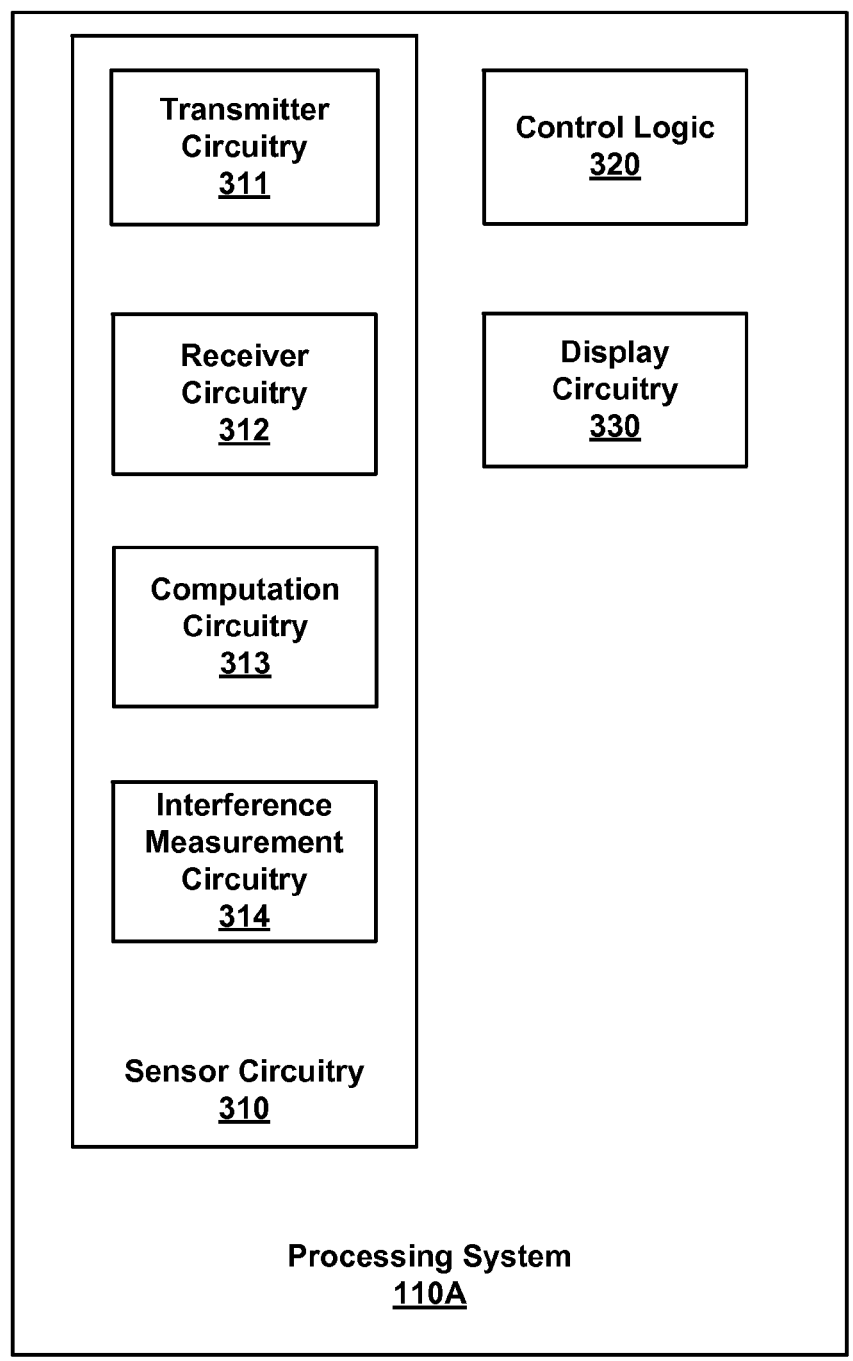
FIG. 3 illustrates an example block diagram of a processing system that may be utilized with an input device, according to various embodiments.

FIG. 3 illustrates a block diagram of some components of an example processing system 110A that may be utilized with an input device (e.g., in place of processing system 110 as part of input device 100), according to various embodiments. Processing system 110A may be implemented with one or more Application Specific Integrated Circuits (ASICSs), one or more Integrated Circuits (ICs), one or more controllers, or some combination thereof. In one embodiment, processing system 110A is communicatively coupled with one or more transmitter electrode(s) and receiver electrode(s) that implement a sensing region 120 of an input device 100. In some embodiments, processing system 110A and the input device 100, of which it is a part, may be disposed in or communicatively coupled with an electronic device 150, such as a display device, computer, or other electronic device.

In one embodiment, of input device 100, processing system 110A includes, among other components: sensor circuitry 310, control logic 320, and display circuitry 330. Processing system 110A and/or components thereof may be coupled with sensor electrodes of a sensor electrode pattern, such as sensor electrode pattern 200 (200A, 200B). For example, sensor circuitry 310 is coupled with one or more sensor electrodes of a sensor electrode pattern (e.g., sensor electrode pattern 200A, 200B, or the like).

Sensor circuitry 310 operates to interact with receiver and transmitter sensor electrodes of a sensor pattern that is utilized to generate a sensing region 120. This includes operating transmitter electrodes to be "silent" (e.g., not transmitting a received transmitter signal) or transmit a transmitter signal. This also includes utilizing receiver sensor electrodes to receive resulting signals and other signals which may be interference. Sensor circuitry 310 may also determine from received resulting signal(s) that an input has occurred in sensing region 120, as well as determining a location of the input with respect to sensing region 120. Sensor circuitry 310 may further determine that interference is occurring and/or determine the nature of the interference. As depicted in FIG. 3, sensor circuitry 310 may include one or more of transmitter circuitry 311, receiver circuitry 312, computation circuitry 313, and interference measurement circuitry 314.

Transmitter circuitry 311 operates to transmit received transmitter signals on one or more transmitter electrodes 260. In a given time interval, transmitter circuitry 311 may transmit or not transmit a transmitter signal (waveform) on one or more of a plurality of transmitter electrodes 260. Transmitter circuitry 311 may also be utilized to couple one or more transmitter electrodes 260 (and respective transmitter path(s)) of a plurality of transmitter electrodes 260 to high impedance, ground, or to a constant voltage when not transmitting a waveform on such transmitter electrodes. The transmitter signal may be a square wave, trapezoidal wave, or some other waveform. Transmitter circuitry 311 may code a transmitter signal, such as in a code division multiplexing scheme. The code may be altered, such as lengthening or shortening the code, under direction of control logic 320. Lengthening the code is one technique for avoiding interference. The waveforms of the transmitter signal may be of different frequency, phase, or amplitude. Code divisions may be temporally or spatially divided.

Receiver circuitry 312 operates to receive resulting signals, via receiver electrodes. The received resulting signals correspond to and include some version of the transmitter signal(s) transmitted via the transmitter electrodes. These transmitted transmitter signals however, may be altered or changed in the resulting signal due to stray capacitance, noise, interference, and/or circuit imperfections among other factors, and thus may differ slightly or greatly from their transmitted versions. To avoid interference, receiver circuitry 312 may be equipped to implement one or more filtering operations, which may include utilizing either or both of linear and non-linear filtering techniques. The filters may be analog or digital. Some non-limiting examples of filters include: low pass filters/demodulators, finite impulse response (FIR) filters, and infinite impulse response (IIR) filters. As will be further described herein, filtering operations may be implemented, not implemented, and/or modified under direction of control logic 320. Resulting signals may be received on one or a plurality of receiver electrodes during a time interval. Receiver circuitry 312 includes a plurality of amplifiers, typically one per receiver electrode. Such amplifiers may be referred to herein as amplifiers, front-end amplifiers, integrating amplifiers, or the like, and receive a reference voltage at a first input and a resulting signal at a second input. The resulting signal is from a receiver electrode of a capacitive sensor device.

Computation circuitry 313 operates to compute/determine a measurement of a change in a capacitive coupling between a transmitter electrode and a receiver electrode. Computation circuitry then uses this measurement to determine the position of an input object (if any) with respect to sensing region 120. Computation circuitry 313 can provide an indication of the quality of a resulting signal. For example looking at the reported position of an input object to determine if it is representative of an intended user action; thus a reported position which appears to "jitter" or otherwise replicate an unrealistic user input can be an indication of interference in a resulting signal received and interference avoidance actions can be implemented. Computation circuitry 313 can further produce a confidence indication as to the quality of demodulated signal.

Interference measurement circuitry 314 operates to measure when and to what extent interference is occurring. This can comprise actively sensing for and measuring interference using receiver sensor electrodes or sensing the effects of interference. Such sensing may be accomplished with one, some, or a combination of all receiver sensor electrodes. Active sensing for and measuring of interference can occur when one or more transmitter electrodes are transmitting or can occur when transmitter electrodes are not transmitting (this can include simply not transmitting or additionally being coupled to a high impedance). Typically, such active sensing for and measuring interference takes up time that might otherwise be used for sensing for an actual input from an input object. Effects which indicate interference is occurring include difficulty or impossibility of receiver circuitry 312 sensing a resulting signal when transmitter electrodes are transmitting (e.g., clipping), and receiver circuitry 312 experiencing corruption of a received resulting signal (e.g., interference typical of a known noise source, or calculated position/motion atypical of user input such as an input object appearing to jump back and forth quickly in the sensing region). While the transmitter electrodes may be "off" or "silent" with respect to transmitting signals for capacitive sensing, they may transmit other signals not used for capacitive sensing. For example, the transmitter electrodes may transmit signals that cannot be picked up by the receiver electrodes, such signals are those that are out of band with the frequency band tracked by the receiver electrode, on a substantially orthogonal code, or below a threshold that is sensed. In other examples, the transmitter electrodes may be utilized to transmit shield or ground signals or may be transmitting RFID or other communications signals that have nothing to do with capacitive sensing signals that can be received with the receiver electrodes.

Certain aspects of signals received by receiver electrodes can be analyzed to determine if there is an interferer present when a transmitter is active. For example, one or a combination of the power, peak amplitude, or spectrum of a received signal (in response to transmitting a transmitter signal) can be analyzed. By analyzing these or other aspects, the presence of interference can be determined and it can be determined if the interference is within or outside of an acceptable bound for capacitive input sensing. In some embodiments, when interference is measured during periods when the transmitter electrodes are not being driven by a transmitter signal (for capacitive sensing purposes), interference can be measured and analyzed directly from the receiver signal which would otherwise be quiet in the absence of interference. Many of the types of effects of interference can be measured passively. Interference measurement circuitry 314 may communicate information about interference determinations to control logic 320 and, under direction of control logic 320, may also alter one or more aspects of how measuring interference and resulting signals takes place. Alternately, linear or non-linear filters based on interference models or a user input usage model may be applied to the capacitance image, the position reporting, or intermediate representations based on one or more measurements of interference.

Control logic 320 comprises decision making logic which directs processing system 110A and sensor circuitry 310 to operate in a selected one of a plurality of different operating modes based on various inputs. Some non-limiting examples of such inputs include one or more measurement(s) of interference and/or indication of an input being sensed or not sensed in sensing region 120 of input device 100. Control logic may be implemented as hardware (e.g., hardware logic and/or other circuitry) and/or as a combination of hardware and instructions stored in a non-transitory manner in a computer readable storage medium.

Display circuitry 330, when included, displays images on a combination display screen/touch screen (e.g., 160/100 of FIGS. 1, 2A, and 2B) that may be referred to herein as an integrated touch screen. Display circuitry 330 applies one or more pixel voltage(s) or current(s) to the display pixel electrodes through pixel source drivers (not shown). Display circuitry 330 applies one or more common drive voltage(s) to the common electrodes (e.g., common electrodes 260), and operates them as V-com electrodes of the display screen portion of the integrated touch screen. (In some embodiments (e.g., line inversion embodiments), display circuitry 330 inverts the common drive voltage in synchronization with a drive cycle of the image display (e.g., 160) upon the display screen of an integrated touch screen.

Discussion of Capacitive Input Device Interference Sources

Typically a capacitive input device, such as a touch screen, suffers from two distinct types of interference: noise interference that is present without a finger (or other object) touching or otherwise in proximity to the capacitive input device in the input region and noise interference that is only present when a finger (or other object) is touching or otherwise in proximity to the input device in the input region.

The first case is associated with noise interference from electronic devices in proximity to the capacitive input device. For instance, back-coupled noise from an LCD underneath a sensor electrode pattern or disposed in conjunction with a sensor electrode pattern is a common source of noise interference. Such interference sources are often stationary in the sense that their frequency components are fairly constant over time.

The second case can arise when noise interference in the environment of the input device is coupled into the sensor from an input object. This is often referred to as "input object coupled interference." The second case can also happen when interference from a power supply charger causes the potential of a sensor electrode pattern (or one or more sensors thereof) to vary with respect to earth ground and an input object which is coupled to earth ground touches the input device. In either case, the conventional strategy is to try to quickly detect input object coupled interference and respond appropriately.

There are conventionally two classes of firmware algorithms which have been proposed to detect input object coupled interference. In one approach, a linear or nonlinear filtering operation is performed on the capacitance measurements that are received from receiver electrodes. The filtering is intended to separate a desired input object signal component from the undesired interference component. This approach has several shortcomings with regard to quick and accurate hypothesis testing (i.e., determining whether the signal represents an input object or interference in a timely manner). In a second approach, a dedicated portion of each frame of scanning a sensor electrode pattern of the input device is spent measuring noise with the transmitters turned off. When the transmitters are turned off, the input object signal is absent and the interference component is much more easily detected. Although this second approach leads to accurate interference detection, it uses up time which could otherwise be used for input object detection and thus either reduces the frame rate with which sensor electrode pattern is scanned or else reduces the SNR. This can be particularly unfortunate in the case of large sensors electrode patterns which have slow sensor settling times and many transmitters electrodes to scan through when transmitting a signal. Such large sensor electrode patterns therefore cannot easily afford the extra time required for dedicated noise scanning during a large portion of the scanning frame.

The approach for operating a capacitive input device that is taken herein relies upon two observations: 1) input object coupled interference is only present when an input object is present and somehow interacting with the input device; and 2) if there is input object coupled interference, it is present during the entire time the input object is touching the capacitive input device in the sensing region.

In particular, observation number two suggests that if there is an interferer it will be present when the input object first touches the input device in the sensing region. The converse is also true: if the interference is not present when the input object first touches the input device in the sensing region, typically it will not spontaneously appear during the time the input object remains in contact within the sensing region of the input device.

Because of these observations described herein, it is therefore sufficient to check for input object coupled noise only up until the time an input object is detected. Once the input object is detected, if an interference condition is met (for example an interference threshold not being exceeded or interference heuristic(s) not occurring, thus indicating that interference is not considered to be too high), it is no longer necessary to spend significant time detecting input object coupled interference so long as the input object is in continued contact with the input device in the sensing region.

Figure 4:
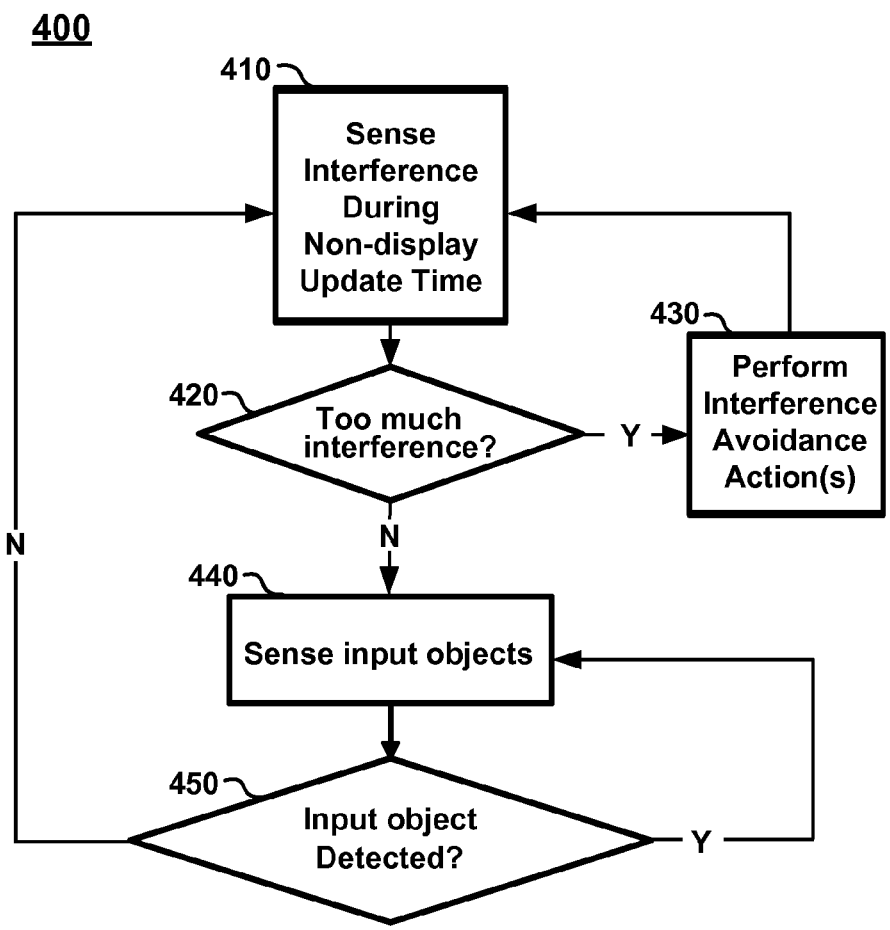
FIGS. 4-6 show flow charts of an example methods of operating a capacitive input device configured to sense in a sensing region, in accordance with various embodiments.

Example Methods of Operation to Detect Interference, Avoid Interference, and Sense FIG. 4 shows a flow chart 400 for an example method of operating a capacitive input device that is configured to sense in a sensing region, according to various embodiments. In the method illustrated by flow chart 400, noise detection will not suffer from false positives induced from input object signals, nor will the frame rate or signal to noise ration suffer from dedicating a portion of normal frame processing to noise processing.

In procedure 410, the transmitters are not transmitting transmitter signals, and interference is sensed. For example, control logic 320 may instruct transmitter circuitry 311 not to transmit on transmitters (e.g., transmitter electrodes 260) of capacitive input device 100. While the transmitters are not transmitting, the receivers of capacitive input device 100 can be used to sense any interference that is present. In an embodiment where the transmitter electrodes 260 are common electrodes utilized in both a touch screen and a display device, the interference is sensed during a non-display update time so that that no transmissions, for either sensing or display updating, will be taking place with the common electrodes.

In procedure 420, the interference measurement circuitry 314 measures interference and based on these measurements control logic 320 determines if the interference is within appropriate parameters or outside of appropriate parameters (e.g., is there too much interference for effective input object sensing). For example, control logic 320 determines if an interference condition indicative of the interference being within acceptable bounds has been met. This determination can be made in various manners, such as by comparison with one or more interference thresholds, analysis of various heuristics and or analysis of spectrums or histograms associated with the interference, and/or other technique(s). If the interference condition is not met, then interference is deemed outside of bounds for acceptable conduct of input sensing. In procedure 420, the determination by control logic 320 as to whether or not an interference condition has been met additionally or alternatively may involve one or more of detecting the power associated with the interference using a power detector (such as a square-law detector), filtering the interference signal (such as with a sum of absolute differences), or other interference determining techniques.

If the interference condition has not been met (for example if interference is deemed to be above a pre-established parameter, then control logic 320 instructs sensor circuitry 310 to perform one or more interference avoidance actions in procedure 430 and the system returns to procedure 410 after the interference avoidance action(s) have been performed. Some non-limiting examples of corrective actions that may be taken in procedure 430 include changing a sensing frequency, changing an order of filters applied, changing the frequency response(s) of the filter(s) used, lowering the report frame rate, changing a code or a code length of a transmitter signal, etc. In some embodiments, the system proceeds to sense input objects in procedure 440 after performing interference avoidance actions in procedure 430.

If the interference condition is met, and thus the interference is not considered to be too high, then control logic 320 instructs transmitter circuitry 311 to transmit transmitter signals and the capacitive input device 100 scans for input(s) in sensing region in procedure 440.

Computation circuitry 313 determines if an input from an input object has been detected in procedure 450. This determination can be accomplished in any appropriate way. For example, processing system 110A may use only the signals just acquired in procedure 440, use the signals just acquired in procedure 440 along with signals acquired in earlier performances of procedure 440, use signals 400 along with signals acquired earlier in performances of procedure 410, etc. As another example, the computation circuitry 313 of processing system 110A may use some or all of the signals acquired in any performance of procedure 440. If one or more inputs are detected, then the processing system 110A loops back to procedure 440. In one embodiment, when no input(s) are detected, then processing system 110A returns from procedure 450 to procedure 410. This is illustrated in flow chart 400 by the return loop between procedure 450 and procedure 410 that occurs in response to an input object not being detected.

Many variations of the procedures illustrated in flow chart 400 are possible. Various embodiments may have additional procedures, fewer procedures, or other procedures those shown by flow chart 400. Embodiments may also have different ordering of the procedures. For example, some embodiments may be configured to sense input from input objects before finishing a determination of whether the interference condition is within an acceptable bound. In such a case, the scanning for input objects may occur in parallel with processing for evaluating the amount of interference, and procedures such as taking an interference avoidance action may be linked differently with other procedures. In some embodiments, interference sensing may be interleaved with sensing cycles. In some embodiments, some interference sensing may be performed during procedure 440, however such sensing is accomplished at a lower fidelity that the interference sensing which is accomplished in procedure 410. For example, after sensing for input objects in procedure 440, some lower fidelity interference sensing may be accomplished and then procedure 440 repeated without moving on to procedure 450. Some interference avoidance actions (e.g., applying filtering) may be accomplished if interference is detected with the lower fidelity interference sensing. In another example, some embodiment may be configured to perform interference avoidance actions 430 while an input object is detected during input object detection 440. Some embodiments may be configured to sense interference during a non-display update time 410 while an input object is detected during input object detection 440.

Figure 5:
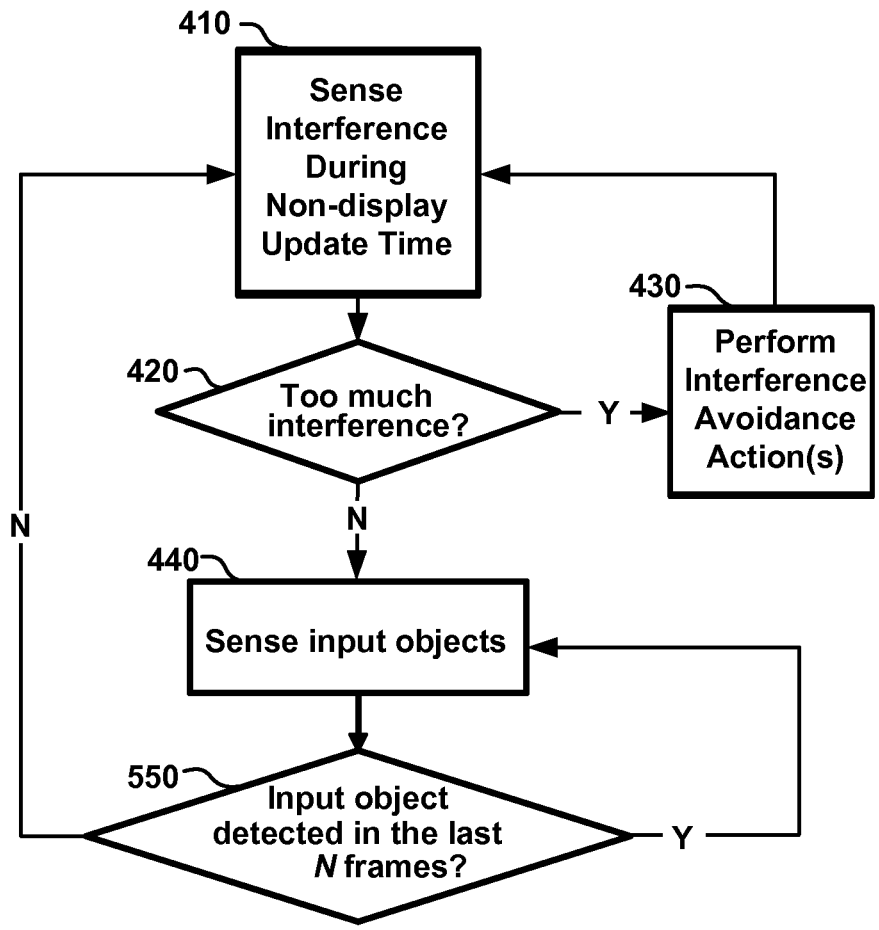

FIG. 5 shows a flow chart 500 for an example method of operating a capacitive input device that is configured to sense in a sensing region, according to various embodiments. Flow chart 500 illustrates a variation on the method illustrated in flow chart 400. For example, flow chart 500 illustrates detection of an input object (in procedure 550) based on the last N frames. Procedures 410-440 of flow chart 500 are analogous to procedures 410-440 of flow chart 400, while procedure 550 is a variation of procedure 450

Procedure 550 varies from procedure 450 by being configured to determine if an input associated with an input object was sensed in sensing region 120 for the last frame acquired, for a selected number of frames acquired, for the last N frames acquired, within a certain time period, etc. In one embodiment, when no input(s) are detected in the last N frames, then processing system 110A returns from procedure 550 to procedure 410. This is illustrated in flow chart 500 by the return loop between procedure 550 and procedure 410 that occurs in response to an input object not being detected in the last N frames. In one embodiment, control logic 320 makes the determination. Where the determination is based on a shorter time period/fewer and more recent frames, transition from procedure 550 to procedure 410 is generally more immediate and very similar to the change between procedures 450 and 410 of flow chart 400. Where the determination is based on history (e.g., a longer time period; select frames from a time period prior to the current time; or including or not including the most recent sample, such as the last N frames where N>1), processing system 110A generally changes from procedure 550 to procedure 410 more slowly than the change from procedure 450 to procedure 410. The change is slower because processing system 110A generally does not immediately start sensing interference in response to a determination of no input objects in the sensing region 120. Both approaches have advantages. For example, processing systems 100A with input object detection periods in procedure 550 that are based on history may be more efficient in sensing and processing some gestures involving multiple sequential taps by input objects, as noise detection does not immediately begin after an input object is lifted. For example, fast finger taps are processed more efficiently after the first tap is detected if N>1.

As another example of variation, some embodiments are configured to sense interference even if input object(s) are detected in the sensing region, at a slower rate than if no input object(s) are detected in the sensing region. For example, some embodiments are configured to sense interference every M frames when input object(s) are detected in the sensing region. As a further example, some embodiments are configured to sense interference in response to a determination that the input object data acquired meets or does not meet some criteria or additional interference condition (e.g., received resulting signals appear corrupted because of a heuristic model, such as a calculated input object position being outside of an expected usage model, or sensor circuitry detecting non-linearity conditions with the receiver(s)). Heuristic models may be based on either the total image or the portion of the image near where an input object is sensed. As yet another example of variation, various embodiments may sense interference if the input(s) detected in the sensing region are determined to have changed (e.g., input(s) not in contact with the input surface, hovering above the input surface, and/or added and/or removed from the sensing region).

It should be appreciated that there is a choice for how to implement the timing of the sensing of procedures 410 and 440. One option is to choose timing so that procedure 440 has the desired frame rate when an input object is present but additional time is allowed for noise detection when no input object is present. In this case there will be a slight increase in latency in detecting an input object. For instance, if the input object processing frame rate is 100 Hz and an additional 25% of time is spent on noise detection, then the input object detection latency can increase by 2.5 mS. However, once an input object is detected, the frame rate reaches its full rate. In the second case a lesser amount of time is spent in procedure 440 when no input object is present such that the frame rate is the same whether or not noise detection is active. In this case there might be a slight decrease in position accuracy for the initial input object position and some complications can be incurred because the filter settling will be different in the sensing carried out in procedures 410 and 440.

Figure 6:
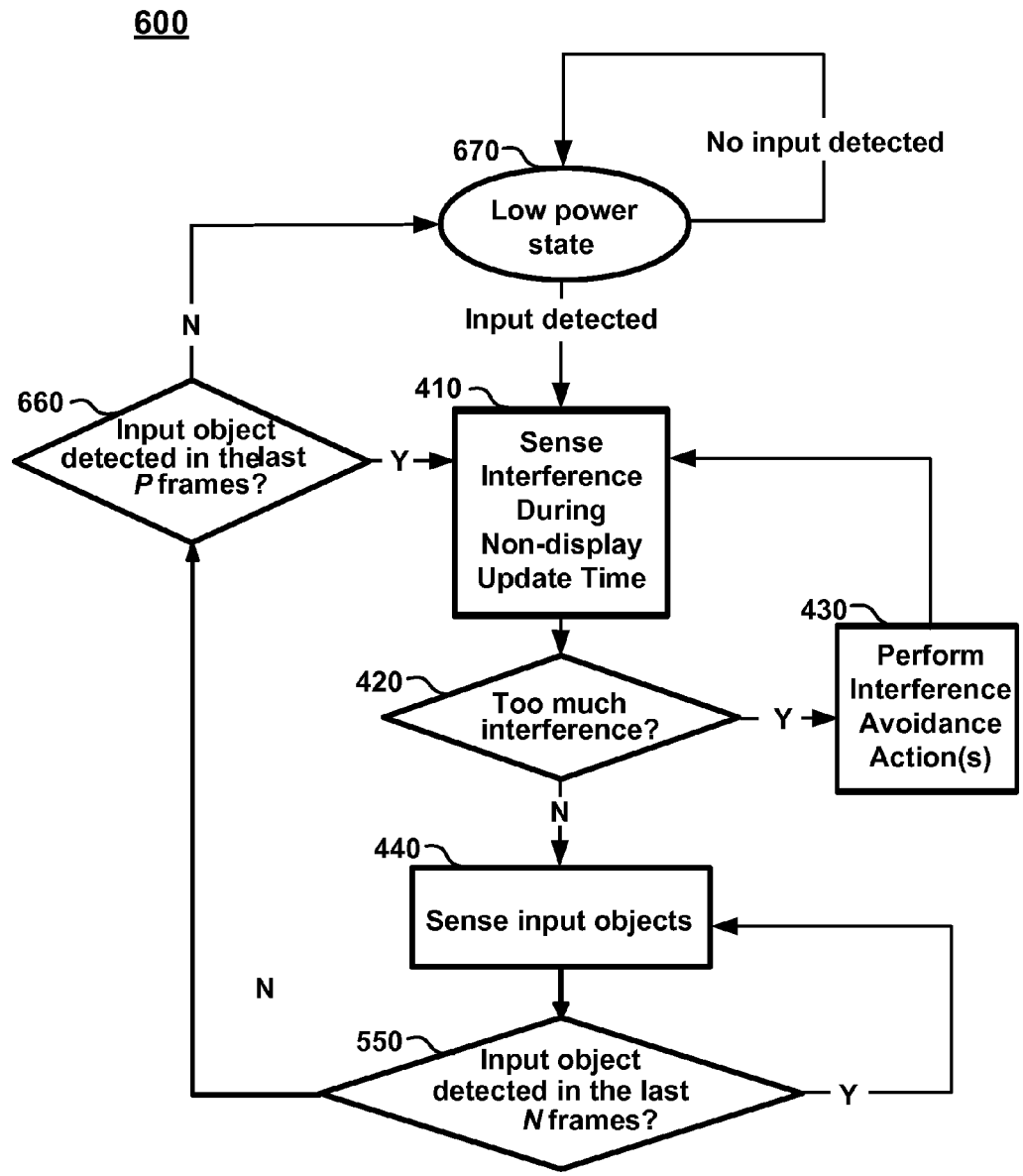

FIG. 6 shows a flow chart 600 for an example method of operating a capacitive input device that is configured to sense in a sensing region, according to various embodiments. Flow chart 600 illustrates some example variations and adaptations on the method illustrated in flow chart 500. In flow chart 600, procedures 410-440 and 550 are analogous to procedures 410-440 and 550 of flow chart 500. In flow chart 600, in response to no input being detected in the sensing region during the last N frames (where N may equal 1), control logic 320 checks in procedure 660 if P frames have passed since input objects have moved or have been removed (where P is greater or equal to N). If input has been detected in the last P frames, then control logic 320 returns processing system 110A to procedure 410 and directs processing system 110A to sense interference. If no input has been detected in the last P frames, then control logic 320 causes processing system 110A and input device 100 to enter a low power state in procedure 670 (e.g., a sleep mode where power utilized by capacitive input device 100 is lower than in normal operation of capacitive input device 100). In this low power state, processing system 110A may be configured by control logic 320 to periodically sense for input in sensing region 120 using any appropriate method. In response to sensing such input, control logic 320 may direct processing system 110A to procedure 410. Where P equals N, procedures 550 and 660 may collapse into the same procedure. A longer time (e.g., multiple or narrower bandwidth) measurement(s) of an input signal (or interference) can improve the fidelity or confidence in that measurement.

Some embodiments are configured to acquire full capacitive frames at the same fidelity regardless of whether or not input from one or more input objects is determined to be in sensing region 120. This may be done by control logic 320 directing sensor circuitry 310 to vary the frame rate. For example, if input associated with one or more input objects is detected in sensing region 120 in a previous frame (or recent history), control logic 320 directs sensor circuitry 310 to spend less or no time on sensing interference (this is in accordance with the two observations described above); thus, input device 100 senses for inputs associated with input objects at a higher capacitive frame rate. In contrast, if no input objects are determined to be in the sensing region in a previous frame (or recent history), control logic 320 directs sensor circuitry 310 to spend more time on sensing interference, and thus input device 100 senses for input objects at a lower capacitive frame rate or in less time at a lower fidelity. Herein, the term "frame rate" refers to the capacitive frame rate and represents how often new object detection reports (report rate) are provided by processing system 110A. Part of a frame time may be dedicated to touch sensing and part of a frame time may be dedicated to noise or interference detection. The confidence in the input conditions (e.g., low/no interference) may allow measurements of resulting signals and interference to be traded off to improve performance based on the calculated current interference conditions being experienced. That is, less or no interference can be accomplished or the fidelity of interference sensing can be decreased; this results in the fidelity of input object sensing being correspondingly increased. In some embodiments, control logic 320 directs sensor circuitry 310 to sense at the same capacitive frame rate regardless of if input objects are determined to be in the sensing region. This may be accomplished in various ways. For example, in some embodiments sensor circuitry 310 is directed to acquire full capacitive frames (e.g., at full fidelity) if input(s) associated with one or more input objects is determined to be in sensing region 120, and to acquire less than full capacitive frames (e.g., at less than full fidelity and with a reduced scan time) if no input associated with an input object is determined to be in sensing region 120. As another example, in some embodiments control logic 320 may direct sensor circuitry 310 to spend more time per scan (at the same frame rate) if input(s) associated with one or more input objects is determined to be in sensing region 120, and spend less time per scan if no input associated with an input object is determined to be in sensing region 120. However, it should be noted that by reducing the scan time, control logic 320 may increase error (e.g., reduce the amount of time for settling, number of measurements, and/or the bandwidth selected). The potential for increased error due to decreased settling time is somewhat unique to the sensor electrode pattern being utilized, and thus needs to be factored in to any reduction in scan time for a particular sensor electrode pattern. Reduced fidelity may correspond to less spatial resolution, lower frequency selectivity, lower dynamic range, fewer measurements, reduced confidence, or the like.

In some embodiments, control logic 320 is configured to direct sensor circuitry 310 to change both the capacitive frame rate and the sensing fidelity in response to input associated with an input object being detected in sensing region 120. Metrics such as frequency, dynamic range, and resolution can be utilized to measure a level of sensing fidelity employed.

Discussion of Frame Rates

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In some embodiments where the two rates differ, successive capacitive images are acquired at different display updating states, and the different display updating states may affect the capacitive images that are acquired. That is, display updating affects, in particular, the baseline capacitive image. Thus, if a first capacitive image is acquired when the display updating is at a first state, and a second capacitive image is acquired when the display updating is at a second state, the first and second capacitive images may differ due to differences in the baseline capacitive image associated with the display updating states, and not due to user input changes in the sensing region. This is more likely where the capacitive sensing and display updating electrodes are in close proximity to each other, or when they are shared (e.g., common electrodes).

For convenience of explanation, a capacitive image that is taken during a particular display updating state is considered to be of a particular frame type. That is, a particular frame type is associated with a mapping of a particular capacitive sensing sequence (e.g., a transmitter frame scan) with a particular display sequence (e.g., half of display lines updated). Thus, a first capacitive image taken during a first display updating state (e.g., quickly scanning all the transmitter electrodes and updating the top half of the display lines) is considered to be of a first frame type, a second capacitive image taken during a second display updating state (e.g., quickly scanning all the transmitter electrodes and updating the bottom half of the display lines) is considered to be of a second frame type, a third capacitive image taken during a first display updating state (e.g., slowly scanning the top half of the transmitter electrodes and updating the top half of the display lines) is considered to be of a third frame type, and so on. Where the relationship of display update state and capacitive image acquisition is periodic, capacitive images acquired cycle through the frame types and then repeat.

Although the discussion here focuses on embodiments with common electrodes, it also applies to embodiments without common electrodes, if the display operation sufficiently affects capacitive sensing. Also, the following discussion regularly refers to examples with a 2:1 capacitive frame rate to display frame rate ratio and two frame types (and thus two baseline images). This is done for ease of explanation. Various embodiments may have various ratios. For example, some embodiments have a three capacitive sensing frame to one display frame ratio and three frame types. As another example, some embodiments have a five capacitive sensing frame to three display frame ratio and fifteen frame types.

FIGS. 7A-7F show an example of such an integrated touch screen embodiment, where the capacitive frame rate is double that of the display update frame rate.

In this example, each of the FIGS. 7A-7F represents the operation during one row update cycle, and the set of FIGS. 7A-7F spans the time needed to update a display frame. The light gray, dashed horizontal lines in the display screens 710 represent common electrodes (e.g., V-com electrodes) that are being used for both display updating and capacitive sensing; these common electrodes are may be implemented in the same fashion as, and interchangeable with, transmitter electrodes 260 in FIGS. 2A and 2B. The bold black horizontal lines 720 (720a-720f) represent the common electrodes that are used during that row update cycle to update the associated row, and the gray rectangles 760 (760a-760c) represent the pluralities of common electrodes that are used during those row update cycles to transmit transmitter signals for capacitive sensing. In this example, the pluralities of common electrodes represented by a single gray rectangle 760a, 760b, 760c are driven together to produce larger effective electrodes. As can be seen in FIGS. 7A-7F, a first full capacitive frame is acquired during the first half of the display update period, and a second full capacitive frame is acquired during the second half of the display update period.

FIGS. 8A-8F show another specific example of an integrated touch screen embodiment, where the capacitive frame rate is double that of the display update frame rate. In the example, each of the FIGS. 8A-8F represents the operation during one row update cycle, and FIGS. 8A-8F span half of the time needed to update a display frame.

The light gray, horizontal lines in the display screens 810 represent common electrodes (e.g., V-com electrodes) that are being used for both display updating and capacitive sensing; these common electrodes are may be implemented in the same fashion as, and interchangeable with, transmitter electrodes 260 in FIGS. 2A and 2B. The bold black horizontal lines 820 (820a-820c) represent the common electrodes that are used during that row update cycle to update the associated row, and the gray rectangles 860 (860a-860c) represent the pluralities of common electrodes that are used during those row update cycles to transmit transmitter signals for capacitive sensing. In this example, the pluralities of common electrodes represented by a single gray rectangle 860a-c are driven together to produce larger effective electrodes. In FIGS. 8A-8C, the common electrodes are driven only for display updating, and half of the display is updated by the end of 8C. Then, in FIGS. 8A-8F, the common electrodes are driven only for capacitive sensing, and an entire capacitive frame is acquired. Not shown are the rest of the steps where the common electrodes are again driven only for display updating for the other half of the display;

and then again driven only for capacitive sensing and another capacitive frame is acquired. With such an approach, the non-display time when capacitive frames are obtained may be matched to part or all of the non-display times used to keep display line update rates substantially the same between different display frame rates (sometimes also called "blanking times."). In this way, the example of FIGS. 8A-8F acquires a first full capacitive frame during the first half of the display update period, and a second full capacitive frame during the second half of the display update period.

The examples of FIGS. 7A-7F and FIGS. 8A-8F gather the capacitive images in a "raster scan" type way. That is, the capacitive image is captured line-by-line, from top to bottom. However, other embodiments may scan the capacitive images in other ways, including scanning from the middle outwards, scanning non-adjacent sections in order, scanning multiple simultaneous independent coded sequences, or temporally independent sequences (e.g., different phase, frequency, or amplitude codes), etc. Similarly, the examples of FIGS. 7A-7F and FIGS. 8A-8F updates the displays in a raster scan type way, and other embodiments may scan the display in other ways.

In the examples of FIGS. 7A-7F and FIGS. 8A-8F, the relationship between the capacitive image scanning and the display update scanning are periodic. Specifically, the capacitive images taken during the first parts of display update cycles face different display operating conditions than those faced by the capacitive images taken during the second parts of display update cycles. However, the capacitive images taken during the first parts of display update cycles all face a similar set of first display operating conditions, and the capacitive images taken during the second parts of display update cycles all face a similar set of second display operating conditions. Thus, the capacitive images taken during the first parts of display update cycles are of a first frame type, and the capacitive images taken during the second parts of display update cycles are of a second frame type.

In some embodiments, the differences between different frame types cause variances in the interference measurements. In such cases, comparing interference measurements taken in different frame types to each other or applying the same criterion to interference measurements taken in different frame types lead to inaccurate gauges of interference.

Some embodiments facing this challenge take interference measurements only in one frame type. For example, some embodiments only take interference measurements in a first frame type, and use other frame types for sensing in the sensing region, interference avoidance operations, etc. Some embodiments keep different interference measurements and criteria for the different frame types; for example, some embodiment keep separate threshold levels of acceptable interference for different frame types. Some embodiments offset, normalize, or otherwise adjust the interference measurements of different frame types to similar references and scales.

Some touch screen embodiments are configured with the assumption that interference due to coupling with the input object is only significant when an input object is sensed in the sensing region. Thus, if an input object arrives in the sensing region without significant interference, these embodiments would operate with the assumption that no significant interference from this input object will occur for the time period that this input object remains in the sensing region.

If interference is detected to be too high (e.g. exceeds an interference threshold) in state "1," the system moves from state "1" to state "4." State "4" involves the second frame type. While in state "4," the system shifts to a different sensing frequency. After the sensing frequency is shifted, the system returns to state "1," and detects interference at the new sensing frequency. Then, if the interference level is low enough, the system changes from state "1" to state "2." If the interference level is still too high, the system again changes from state "1" to state "4."

Some embodiments take interference measurements only in one frame type. For example, some embodiments only take interference measurements in a first frame type, and use other frame types for sensing in the sensing region, interference avoidance operations, etc. Some embodiments keep different interference measurements and criteria for the different frame types; for example, some embodiment keep separate threshold levels of acceptable interference for different frame types. Some embodiments offset, normalize, or otherwise adjust the interference measurements of different frame types to similar references and scales.

Example Method of Operating a Capacitive Touch Screen

Figure 9B:
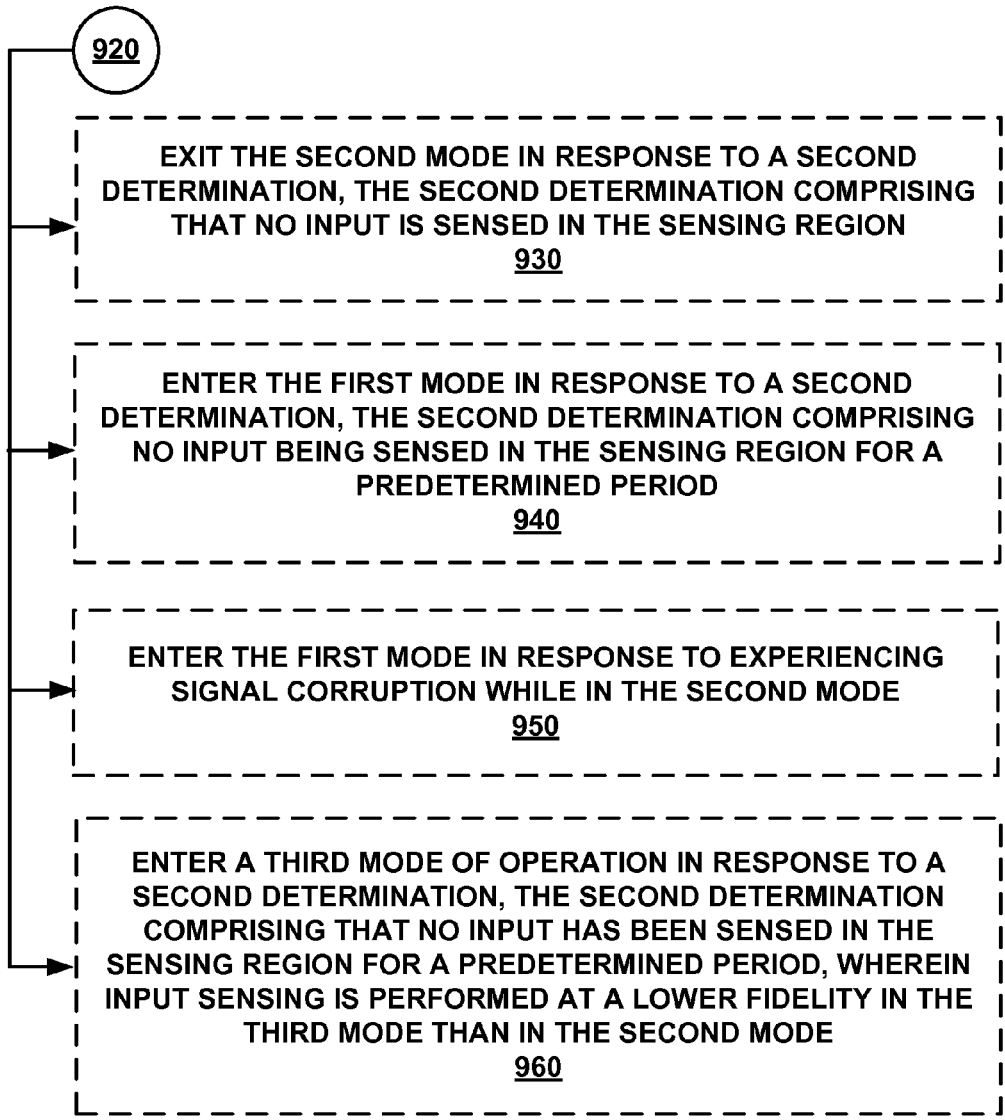

FIGS. 9A and 9B illustrate a flow chart 900 of example methods of operating a capacitive touch screen configured to sense in a sensing region, in accordance with various embodiments. For purposes of illustration, during the description of flow chart 700, reference will be made to components of input device 100 of FIG. 1, sensor electrodes of FIGS. 2A, 2B and 3, components of a processing system 110 that as illustrated in FIG. 3 (and as also depicted in FIGS. 1, 2A and 2B), and procedures illustrated in flow charts 400, 500, and 600. In some embodiments, not all of the procedures described in flow chart 900 are implemented. In some embodiments, other procedures in addition to those described may be implemented. In some embodiments, procedures described in flow chart 900 may be implemented in a different order than illustrated and/or described.

At 910 of flow chart 900, in one embodiment, capacitive input device 100, which may be implemented as a touch screen, is operated in a first mode. For example, control logic 320 may direct sensor circuitry 310 to operate in this first mode. Operation in this first mode is described in conjunction with procedures 410 and 420 of flow charts 400, 500, and 600. The first mode comprises interference sensing at a first level and also comprises input sensing. The interference sensing is accomplished during a non-display update time of a display (e.g., display 160) that is associated with the touch screen 100. The first mode may comprise control logic 320 directing sensor circuitry 310 to utilize a first frame rate in which a certain portion of a frame is dedicated to interference sensing and a certain portion of a frame is dedicated to input sensing. In one embodiment, control logic 320 directs that some or all of the interference sensing performed in the first mode of operation is performed with transmitter electrodes of capacitive input device 100 in a non-transmitting state. When the transmitter electrodes are common electrodes for a touch screen/display device, the interference sensing is accomplished when they are not transmitting and thus no input sensing or display updating is taking place.

While in this first mode of operation, if interference is sensed which does not meet an interference condition (and is thus considered too high) one or more interference avoidance actions may be implemented. Conduct of this interference avoidance while in the first mode of operation is described in procedure 430 of flow charts 400, 500, and 600.

Some non-limiting examples of interference avoidance actions which may be implemented alone or in various combinations include: modifying a sensing frequency, modifying a filtering operation, increasing a code length utilized in a code division multiplexing sensing scheme, and implementing a non-linear filtering technique. It is also possible to increase overall signal quality by lowering the effective report rate or increasing latency (e.g., narrowing the receiver bandwidth, applying Infinite Impulse Response filtering, Finite Impulse Response filtering, or Kaiser filtering).

At 920 of flow chart 900, in one embodiment, the capacitive input device is switched to operating in a second mode, rather than in the first mode. This second mode and switching to this second mode are described in procedures 420 and 440 of flow charts 400, 500, and 600. Control logic 320, in one embodiment, directs sensor circuitry 310 to operate in the second mode. The switch to the second mode occurs in response to two conditions occurring. The first condition is that interference measured with capacitive input device 100 while in the first mode has met an interference condition, and is thus deemed not to be within an effective range for input sensing (e.g., interference is not too high). The second condition is a determination that an input is in the sensing region of capacitive input device 100. While in the second mode, interference sensing with capacitive input device 100 is either not performed or else is performed at a second level that is lower in fidelity than the first level of interference sensing. The lower fidelity may be due to a variety of factors. Some non-limiting examples of such factors include: different interference detection techniques being utilized, alteration of the frame rate, and a smaller portion of a frame being dedicated to interference sensing that the portion which is utilized for interference sensing in the first mode.

At 930 of flow chart 900, in one embodiment, the method as described in 910 and 920 further includes exiting the second mode in response to a second determination, where the second determination comprises determining that no input is sensed in sensing region 120. This second determination is described in procedure 450 of flow chart 400 and in a modified fashion in procedure 550 of flow charts 500 and 600. In one embodiment, control logic utilizes information from computation circuitry 313 to make this second determination and direct that sensor circuitry 310 exit the second mode.

At 940 of flow chart 900, in one embodiment, the method as described in 910 and 920 further includes entering the first mode in response to a second determination, where the second determination comprises determining that no input is sensed in sensing region 120. This second determination is described in procedure 450 of flow chart 400 and in a modified fashion in procedure 550 of flow charts 500 and 600. In one embodiment, control logic 320 utilizes information from computation circuitry 313 to make this second determination and direct that sensor circuitry 310 exit the second mode and enter the first mode. This entry into the first mode can be an initial entry into the first mode of operation or can be an exit from another mode of operation, such as the second mode, and a re-entry into the first mode of operation.

At 950 of flow chart 900, in one embodiment, the method as described in 910 and 920 further includes entering the first mode in response to experiencing signal corruption while in the second mode. This corruption detection is described above as an aspect of procedures 550 of flow charts 500 and 600. In one embodiment, control logic 320 utilizes information from computation circuitry 313 to determine if signal corruption is occurring and thus that the second mode should be exited and the first mode should be entered. This entry into the first mode can be an initial entry into the first mode of operation or can be an exit from another mode of operation, such as the second mode, and a re-entry into the first mode of operation.

At 960 of flow chart 900, in one embodiment, the method as described in 910 and 920 further includes entering a third mode of operation in response to a second determination. This third mode and the second determination are described above in conjunction with description of procedures 550, 660, and 670 of flow chart 600. The second determination is made by control logic 320, in some embodiments, and comprises a determination that no input has been sensed in sensing region 120 for a predetermined period. The period may be a period of time or a number of frames of capacitive input device 100. In this third mode input sensing is performed at a lower fidelity than in the second mode. The lower fidelity may be as a result of one or more factors. Some of the factors that may result in lower fidelity include, but are not limited to: using fewer sensor electrodes, sensing less frequently, sensing at a different rate, and using a smaller segment of a frame for conducting input sensing.

In one embodiment, the third mode is exited and the first mode is entered in response to a third determination. This third determination is made, in one embodiment, by control logic 230 based on input from computation circuitry 313. The third determination comprises input being sensed in sensing region 120 while in capacitive input device 100 is operating in the third mode. This shift from the third, low power mode, back to the first mode is illustrated in transition from procedure 670 to procedure 410 in flow chart 600.

Thus, the examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed.

What is claimed is:

1. A processing system for a capacitive touch screen, said processing system comprising:
sensor circuitry configured to be communicatively coupled with sensor electrodes of said capacitive touch screen;
display circuitry configured to update a display of said capacitive touch screen, wherein the sensor electrodes of the capacitive touch screen comprise a plurality of common electrodes configured to transmit transmitter signals to update the display and to perform capacitive sensing; and
control logic configured to:
operate said capacitive touch screen in a first frame type corresponding to a first capacitive sensing sequence that is performed by said plurality of common electrodes within a display sequence, said first frame type comprising a first period for interference detection and a second period for input object capacitive sensing;
determine, using said first capacitive sensing sequence of said first period of said first frame type, interference in said first frame type, wherein said interference comprises an input object coupled interference component;

determine, using said first capacitive sensing sequence of said second period of said first frame type, that an input object is in a sensing region of said capacitive touch screen;

operate, in response to determining that said input object is in the sensing region, said capacitive touch screen in a second frame type without interference detection, wherein said capacitive touch screen operates said plurality of common electrodes at a capacitive sensing frequency that is shifted from said first frame type to said the second frame type, and wherein the control logic is configured to select the second frame type based on said interference that is determined in said first period of said first frame type;

acquire, using a second capacitive sensing sequence of said second frame type, a capacitive image of the sensing region; and filter, using said interference in said first period of said first frame type, the input object coupled interference component from said capacitive image to determine an input object signal in said capacitive image while operating said capacitive touch screen in said second frame type.

2. The processing system of claim 1, wherein said plurality of common electrodes are maintained in a non-transmitting state during interference sensing in said first frame type.

3. The processing system of claim 1, wherein said control logic is further configured to:
exit said second frame type in response to a second determination while in said second frame type that no input is in said sensing region.

4. The processing system of claim 1, wherein said control logic is further configured to:
enter said first frame type in response to a second determination that no input has been sensed in said sensing region for a predetermined period.

5. The processing system of claim 1, wherein said control logic is further configured to:
enter said first frame type in response to experiencing signal corruption while in said second frame type.

6. A capacitive touch screen comprising:
a display;
a plurality of common electrodes configured to transmit transmitter signals to update the display of said capacitive touch screen and to perform capacitive sensing; and
a processing system coupled with said plurality of sensor electrodes, said processing system configured to:
operate said capacitive touch screen in a first frame type corresponding to a first capacitive sensing sequence that is performed by said plurality of common electrodes within a display sequence, said first frame type comprising a first period for interference detection and a second period for input object capacitive sensing;
determine, using said first capacitive sensing sequence of said first period of said first frame type, interference in said first frame type, wherein said interference comprises an input object coupled interference component;
determine, using said first capacitive sensing sequence of said first period of said first frame type, that an input object is in a sensing region of said capacitive touch screen;

operate, in response to determining that said input object is in said sensing region, said capacitive touch screen in a second frame type without interference detection, wherein said capacitive touch screen operates said plurality of common electrodes at a capacitive sensing frequency that is shifted from said first frame type to said the second frame type, and wherein the processing system is configured to select the second frame type based on said interference that is determined in said first period of said first frame type;

acquire, using a second capacitive sensing sequence of said second frame type, a capacitive image of the sensing region; and filter, using said interference in said first period of said first frame type, the input object coupled interference component from the capacitive image to determine an input object signal in said capacitive image while operating said capacitive touch screen in said second frame type.

7. The capacitive touch screen of claim 6, wherein said processing system is further configured to:
exit said second frame type in response to a second determination while in said second frame type that no input is in said sensing region.

8. The capacitive touch screen of claim 6, wherein said processing system is further configured to:
enter said first frame type in response to a second determination that no input has been sensed in said sensing region for a predetermined period.

9. The capacitive touch screen of claim 6, wherein said processing system is further configured to:
enter said first frame type in response to experiencing signal corruption while in said second frame type.

10. A method comprising:
operate a capacitive touch screen in a first frame type corresponding to a first capacitive sensing sequence that is performed by a plurality of common electrodes within a display sequence, said first frame type comprising a first period for interference detection and a second period for input object capacitive sensing;
determine, using said first capacitive sensing sequence of said first period of said first frame type, interference in said first frame type;
determine, using said first capacitive sensing sequence of said second period of said first frame type, that an input object is in a sensing region of said capacitive touch screen;
operate, in response to determining that said input object is in said sensing region, said capacitive touch screen in a second frame type without interference detection, wherein said capacitive touch screen operates said plurality of common electrodes at a capacitive sensing frequency that is shifted from said first frame type to said the second frame type, and wherein the second frame type is selected based on said interference that is determined in said first period of said first frame type;
acquire, using a second capacitive sensing sequence of said second frame type, a capacitive image of the sensing region; and
filter, using said interference in said first period of said first frame type, said input object coupled interference component from the capacitive image to determine an input object signal in said capacitive image while operating said capacitive touch screen in said second frame type.

11. The method as recited in claim 10, further comprising: exiting said second frame type in response to a second determination, said second determination comprising that no input is sensed in said sensing region.

12. The method as recited in claim 10, further comprising: entering said first frame type in response to a second determination, said second determination comprising no input being sensed in said sensing region for a predetermined period.

13. The method as recited in claim 10, further comprising: entering said first frame type in response to experiencing signal corruption while in said second frame type.

* * * * *